(12) United States Patent
Kato et al.

(10) Patent No.: US 8,850,967 B2
(45) Date of Patent: Oct. 7, 2014

(54) CROISSANT DOUGH, AND A METHOD AND MACHINE FOR FORMING THAT DOUGH

(75) Inventors: Akihiko Kato, Utsunomiya (JP); Takao Takagi, Utsunomiya (JP); Akira Todate, Utsunomiya (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 361 days.

(21) Appl. No.: 13/218,200

(22) Filed: Aug. 25, 2011

(65) Prior Publication Data

US 2012/0052179 A1    Mar. 1, 2012

(30) Foreign Application Priority Data

Aug. 25, 2010   (JP) .................................. 2010-187993

(51) Int. Cl.
*A21C 9/04* (2006.01)
*A23P 1/00* (2006.01)
*A21C 9/06* (2006.01)
*A21C 9/08* (2006.01)

(52) U.S. Cl.
CPC ...................................... *A21C 9/088* (2013.01)
USPC .......................... 99/450.1; 99/450.2; 99/450.6

(58) Field of Classification Search
CPC .......... A21C 9/02; A21C 9/085; A21C 9/088; A21C 11/002; A21C 11/004
USPC ........ 99/450.1, 450.2, 450.4, 450.6; 426/502, 426/549
See application file for complete search history.

(56) References Cited

U.S. PATENT DOCUMENTS

| 4,526,795 A * | 7/1985 | Wolf ............................. 426/297 |
| 4,582,472 A | 4/1986 | Hanson |
| 4,961,697 A * | 10/1990 | De Fockert et al. .......... 425/327 |
| 6,622,617 B1 | 9/2003 | Colamussi |
| 2011/0268840 A1* | 11/2011 | McDonnell et al. ............ 426/19 |

\* cited by examiner

*Primary Examiner* — Dana Ross
*Assistant Examiner* — Lindsey C Teaters
(74) *Attorney, Agent, or Firm* — Myers Andras LLP; Joseph C. Andras

(57) ABSTRACT

Forming machines and methods for forming a croissant dough piece in which the lateral end sides can be bent to form and join them, while they contact the upper surface of a transporting conveyor, are provided. In one aspect of the invention, the forming machines include an interception pin 75, which is arranged above the transporting conveyor 5 such that it is vertically movable and it is also movable in the conveying direction of the transporting conveyor 5. The forming machine also includes a plurality of pressing members 99, which are arranged above the transporting conveyor 5 such that they are vertically movable and are movable in the conveying direction of the transporting conveyor 5 at a velocity faster than that of the interception pin 75, and they are movable toward and away from each other. When the interception pin 75 intercepts the center portion of the croissant dough piece 3 in the length thereof at the leading side thereof along the conveying direction, the pressing members 99 bend both sides of the croissant dough piece 3 about the interception pin 75 that is centered thereon to form or join them, while downward components of force are applied to both sides thereof. The circumferential surface of the interception pin 75 ejects air when the pressing members 99 are lifted up and the interception pin 75 is pulled up from the croissant dough piece 3.

16 Claims, 7 Drawing Sheets

CROISSANT DOUGH, AND A METHOD AND MACHINE FOR FORMING THAT DOUGH

RELATED APPLICATIONS

This application claims benefits of Japanese Patent Application No. 2010-187993, filed Aug. 25, 2010, and all its disclosures are incorporated herein by reference.

BACKGROUND OF THE INVENTION

1. Technical Field

This invention relates to croissant dough, and a method and a machine for forming that dough. In particular, this invention relates to croissant dough in which both ends are joined and are prevented from an inadvertent separation after baking, wherein the method and the machine for forming such croissant dough enable both ends to be formed or joined, while both ends are prevented from being inadvertently lifted up, when both ends of the croissant dough are moved toward each other.

2. Background of the Invention

Conventionally, a method for forming or joining both ends of a croissant dough piece that has already been linearly rolled up such that the central portion of it has a large diameter and both ends are gradually tapered, while both ends move toward each other, is carried out as follows: The croissant dough pieces are supplied and placed on a conveyor such that the length of each dough piece is oriented perpendicularly to the conveying direction of the conveyor. While the croissant dough pieces are conveyed on the conveyor, an interception pin intercepts a center portion in the length of the target croissant dough piece at its leading side in the conveying direction.

When the interception pin intercepts the croissant dough piece as discussed above, a pair of pressing members that are movably arranged to move toward and away from each other bend that dough piece about the interception pin that is centered thereon such that both ends of that dough piece move toward each other. The pressing members then pressure both ends of that dough piece to join them. (See Patent Literature 1, 2, and 3. All disclosures of them are incorporated herein by reference.)

PRIOR ART DOCUMENTS

Patent Literature

[Patent Literature 1] U.S. Pat. No. 6,622,617 to Colamussi
[Patent Literature 2] U.S. Pat. No. 4,582,472 (corresponding to Japanese Patent Laid-open Patent Publication No. H03-38,816) to Hanson
[Patent Literature 3] U.S. Pat. No. 4,961,697 to De Focket, et al.

SUMMARY OF THE INVENTION

Problems to be Solved by the Invention

Patent Literature 1, 2, and 3 assume that both ends of the croissant dough piece move horizontally and are continuously deformed when both ends bend toward each other. However, because the croissant dough piece before both ends are bent has a shape in which the central portion of it has a large diameter and both ends are gradually tapered, both ends of the croissant dough may often be separated from the upper surface of the conveyor for conveying the croissant dough due to the characteristics of the croissant dough. Further, in certain instances, the croissant dough may be in a tilted position, with one end of it contacting the upper surface of the conveying belt of the conveyor, while the other end is facing upwardly away therefrom.

Therefore, when both ends of the croissant dough join each other, they are often slightly shifted such that one end is above the other end. Thus, the stability of the improved appearance of the shape of the product may be degraded.

Further, in the croissant dough manufactured by the above conventional forming method, because joined ends may often open ("separated from each other") after baking, there is a problem on the instability of the improved appearance of the shape of the product

Means to Solve the Problem

This invention provides croissant dough that overcomes the problem in the prior art, and methods and machines for forming it.

The croissant dough piece of the present invention is produced by bending a piece that has already been linearly rolled up such that both lateral side portions thereof move toward each other, and by clamping the tip ends of both lateral side portions to each other. This croissant dough piece is characterized in that it generally forms a substantial isosceles triangle in which each angle forms an acute angle; and wherein both lateral side portions are pressure-bonded or clamped to each other over their entire lengths between the clamped tip ends and an opening that is formed adjacent to the base of the isosceles triangle.

In this croissant dough piece, both lateral side portions, which are pressure bonded or clamped to each other over their entire lengths between the clamped tip ends and the opening, may be rolled to the tip ends when they are bent toward each other such that they are pressure-bonded or clamped to each other.

One method for forming the croissant dough piece of the present invention comprises the steps of conveying a croissant dough piece that has already been linearly rolled up on a transporting conveyor in the conveying direction thereof perpendicularly to the length of the croissant dough piece, intercepting a center portion in the length of the croissant dough piece at its leading side in the conveying direction by an interception pin, which is located above the transporting conveyor, to allow a vertical motion and a traveling motion along the conveying direction, and wherein when the interception pin intercepts the croissant dough piece it forces both lateral side portions of the croissant dough piece to move toward each other so as to form or clamp the tip ends of both lateral side portions to each other. This method is characterized in the steps of bending both lateral side portions of the croissant dough piece about the interception pin that is centered thereon by means of pressing members, which are located above the transporting conveyor to allow a vertical motion, a traveling motion that is faster than that of the interception pin along the conveying direction, and a motion to move toward and away from each other, applying downward components of force on both lateral end portions of the croissant dough piece to form or clamp both lateral end portions to each other when pressurized thereon to form or clamp them; and thereafter lifting up the pressing members and pulling up the interception pin from the croissant dough piece.

In the method for forming a croissant dough piece, the pressing members may further roll the lateral end portions to be further extended when the pressing members pressurize the lateral end portions.

In the method for forming a croissant dough piece, the peripheral surface of the interception pin may inject air when the interception pin is pulled up from the croissant dough pieces.

In the method for forming a croissant dough piece, an uplift-prevention member may intercept from above the croissant dough piece when that interception pin is pulled up therefrom, to prevent the croissant dough piece from being lifted up. The uplift-prevention member is vertically movable independently from that interception pin.

One aspect of the present invention is a forming machine for forming a croissant dough piece in which one that has already been linearly rolled up is conveyed in the conveying direction perpendicularly to the length of the croissant dough piece. The forming machine comprises a transporting conveyor for conveying the croissant dough piece in the conveying direction; and an interception pin for intercepting the center portion of the length of the croissant dough piece at the leading side thereof along the conveying direction; and a plurality of pressing members for pressing the lateral end portions of the croissant dough piece about the interception pin that is centered thereon such that both ends of that dough piece move toward each other to form or join them. The machine is characterized by a first supporting means for supporting the interception pin, wherein the first supporting means is arranged above the transporting conveyor such that the first supporting means is vertically movable and also movable in the conveying direction;

a second supporting means for supporting the interception members to allow them move toward each other in a direction perpendicular to the conveying direction of the transporting conveyor, wherein the second supporting means is movably supported in the conveying direction by the first supporting means; and wherein each pressing member is provided with an inclined depressing surface such that the lower portions of the pressing members move away from one another to create downward components of force the lateral end portions of the croissant dough piece when they are formed or joined.

Another aspect of the present invention is a forming machine for forming a croissant dough piece in which a croissant dough piece that has already been linearly rolled up is conveyed to a predetermined site in the conveying direction and perpendicularly to the length of the croissant dough piece. The forming machine comprises a transporting conveyor for conveying the croissant dough piece in the conveying direction; an interception pin for intercepting the center portion of the croissant dough piece in the length thereof at the leading side thereof along the conveying direction; and a plurality of pressing members for pressing the lateral end portions of the croissant dough piece about the interception pin that is centered thereon such that both ends of that dough piece move toward each other to form or join them.

The forming machine is characterized by having a first supporting means for supporting the interception pin, wherein the first supporting means is arranged above the transporting conveyor at the predetermined site such that the first supporting means is vertically movable and also movable in the conveying direction;

a second supporting means for supporting the interception members to allow them to move toward each other in a direction perpendicular to the conveying direction of the transporting conveyor, wherein the second supporting means is movably supported in the conveying direction by the first supporting means; and wherein each pressing member is provided with an inclined depressing surface such that the lower portions of the pressing members move away from one another to apply downward components of force on the lateral end portions of the croissant dough piece when they are formed or joined.

In the above forming machines, the interception pin may be composed of porous material or micro-porous material such that the circumferential surface thereof can be injected with air.

The above forming machines may further comprise an uplift-prevention member for intercepting from above the croissant dough piece when the interception pin is pulled up therefrom, to prevent the croissant dough piece from being lifted up.

Another aspect of the present invention is a forming machine for forming an elongated dough piece. This forming machine comprises a transporting conveyor for conveying an elongated dough piece that has already been linearly rolled up to a predetermined site in the conveying direction perpendicularly to the length of the elongated dough piece; an interception member for intercepting the center portion of the conveyed elongated dough piece of the length thereof at the leading side thereof along the conveying direction; a plurality of pressing members for pressing the lateral end portions of the elongated dough piece about the interception pin that is centered thereon such that both ends of that dough piece move toward each other to form or join them. The forming machine is characterized in that the interception member includes a means for ejecting an air jet from the circumferential surface of the interception member.

In this forming machine, the interception member may be composed of porous material or micro-porous material such that the circumferential surface thereof can be injected with air.

In the forming machine of the present aspect, the transporting conveyor and the interception member may be used as in the conventional forming machine. Therefore, the forming machine of the present aspect of the present invention can be configured by replacing the conventional interception member in the conventional forming machine for forming a croissant dough piece (or another elongated food dough piece) with the interception pin that is composed of porous material or micro-porous material such that the circumferential surface thereof can be injected with air.

Preferably, the interception member ejects the air jet when it is pulled up from the elongated dough piece.

The forming machine of the present aspect of the present invention may further comprise an uplift-prevention member for intercepting from above the croissant dough piece when the interception pin is pulled up therefrom, to prevent the croissant dough piece from being lifted up.

As used herein the term "croissant dough" is not intended to strictly limit the dough to croissant dough itself, but refers to croissant-like dough and elongated dough that is shaped like the croissant dough.

As used herein the terms "dough piece" and "dough pieces" refer to a single piece of dough and a plurality of pieces of dough, respectively. Each dough piece corresponds to a single product.

Advantage of the Invention

With the present invention, because the croissant dough piece can be prevented having its joined ends from opening after baking, the stability of the product's appearance can be improved.

With the present invention, when both lateral side portions of the croissant dough piece bend about the interception pin that is centered thereon by means of pressing members, downward components of force cause both lateral end portions of the croissant dough piece to form or join both lateral end portions to each other when pressurized thereon, to form or clamp them. Therefore, the lateral end portions of the croissant dough piece can be prevented from having variations in the level when they are formed or joined. Accordingly, the forming or joining of the lateral end portions of the croissant dough piece can be steadily carried out, and thus products with a stable appearance can be obtained.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below serve to explain the principles of the present invention.

DETAILED DESCRIPTION OF THE PREFERRED EMBODIMENTS

Figure 1:
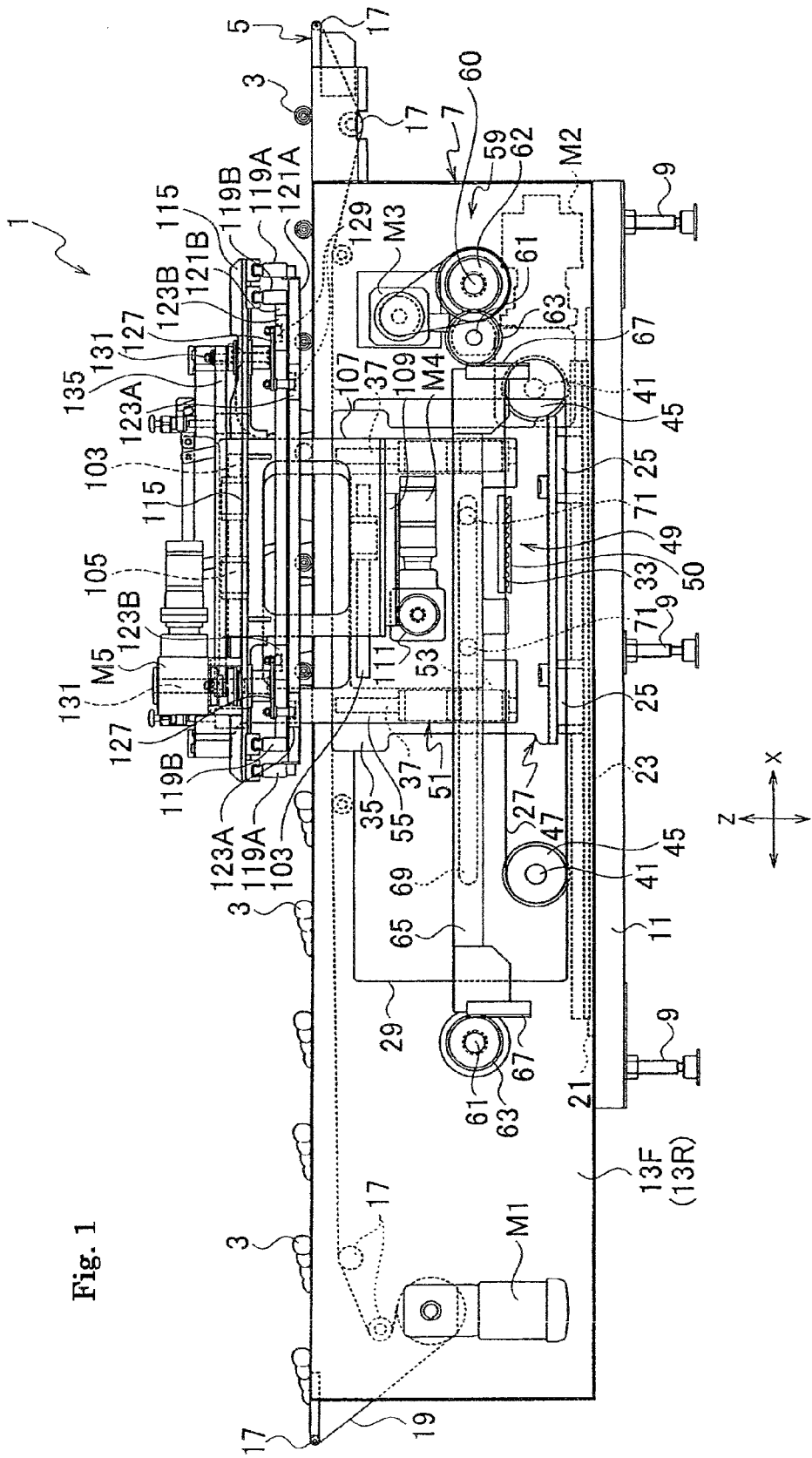
FIG. 1 is a front view schematically illustrating the forming machine of one embodiment of the present invention.

In reference to FIG. 1, illustrated is a forming machine 1 for forming croissant dough (or similar elongated dough) that has been linearly rolled up in advance such that the central portion of it has a large diameter and both ends are gradually tapered. The forming machine 1 includes a mounting frame 7. Mounted on the mounting frame is a transportation conveyor 5 for horizontally conveying the croissant dough pieces (elongated dough pieces) 3 in the conveying direction (X-axis direction) perpendicular to the longitudinal (Y-axis direction: normal to the drawing of FIG. 1) of the croissant dough pieces (elongated dough pieces) 3. In particular, the mounting frame 7 includes a base frame 11 provided with a plurality of leg members 9. On the base frame 11, at both sides in the Y-axis direction (front-back direction), a vertical front-side frame 13F and a vertical rear side frame 13 R (see FIG. 3), both shaped like a box, are provided.

Further, a conveyor belt 19 is guidingly supported by a sliding plate 15 and a plurality of guiding rollers 17, both provided between and above the front side frame 13F and the rear side frame 13R. On the front side frame 13F, a motor M1 is mounted for driving the transporting conveyor 5 in the X-axis direction (the lateral direction). Therefore, when the motor M1 is rotatably operated, the transportation conveyor 5 is driven and moved to convey the croissant dough 3 from the right side to the left side in FIG. 1.

Provided on the upper surface of the base frame 11 is a base plate 21 on which guiding rails 23 that extend along the conveying direction (X-axis direction) are mounted near the front side frame 13F and the rear side frame 13R. X-axis sliding frames 27 are slidably supported on the guiding rails 23, through front and rear sliding guides 25 such that the X-axis sliding frame 27 can be slide thereon in the X-axis direction. In particular, both the front sliding guide 25 and the rear sliding guide 25 are provided with a base member 31. One portion of the base member 31 is inserted through a large opening 29 (see FIG. 1) on each opposite surface of the corresponding front side frame 13F and the corresponding rear side frame 13R. The front base member 31 and the rear base member 31 are integrally connected by a connecting member 33 (see FIG. 3).

In the illustrative embodiment, the base members 31 partly protrude into the front side frame 13 F and the rear side frame 13R, both shaped like a box. In the front and rear side frames 13F and 3R, front and rear longitudinal plates 35 are vertically provided at locations in which the base members 31 protrude such that each longitudinal plate 35 is integrated with the corresponding side frames 13F or 13R. The front and rear longitudinal plates 35 are provided with guiding rails 37, each extending vertically.

On the base plate 21, a reciprocating driving mechanism 39 is provided for driving and reciprocating the X-axis direction sliding frame 27 in the X-axis direction. In particular, two rotating shafts 41, which are elongated in the Y-axis direction, are rotatably supported by the base plate 21 via corresponding pillow blocks 43 at locations separate from each other in the X-axis direction on the base plate 21. One of the respective rotating shafts 41 is drivingly connected to a motor M2 such as a servo motor for forwardly and reversely rotating that rotating shaft 41.

Further, the respective rotating shafts 41 are provided with pulleys 45 on which a belt 47 such as a timing belt, which extends along the X-axis direction, is entrained. The belt 47 is connected to the connecting member 33 at a junction 49 (see FIG. 1). That is, the belt 47 is integrally clamped between the connecting member 33 and a clamping member 50 that is fastened on the connecting member 33 by a fastener (not shown) such as a bolt or the like.

When the rotating shafts 41 are thus drivingly rotated by the motor M2, the belt 47 is drivingly moved in the X-axis direction (the lateral direction in FIG. 1) such that the X-axis direction sliding frame 27 is moved in the X-axis direction in unison with the belt 47. The configuration of the reciprocating driving mechanism 39 for reciprocally moving the X-axis direction sliding frame 27 in the X-axis direction is not limited to the above configuration, but may employ other configurations, as, for instance, a ball screw mechanism, a rack and pinion mechanism, and a linear motor.

On the X-axis direction sliding frame 27, an elevating frame 51 (a first supporting means) is movably supported such that the elevating frame 51 can be vertically moved. The elevating frame 51 is provided with front and rear elevating plates 55, which are guided and supported by the guiding rails 37 on the longitudinal plates 35 through sliding guides 53, to allow the elevation of the elevating plates 55 along the vertical direction (the X-axis direction). The upper portions of the front and rear elevating plates 55 are integrally connected by right and left connecting members 57, which extend in the back and forth directions above the conveyor belt 19.

To elevate the elevating frame 51, an elevation driving mechanism 59 is provided. In particular, a motor M3 (see FIG. 1) such as a servo motor is provided in the box-like configured front side frame 13F. The motor M3 is drivingly connected with right and left rotating shafts 60, which are extended in the back and forth directions (the Y-axis direction), via an appropriate cooperative means such as a timing pulley and a timing belt. Both ends in the back and forth directions of the respective rotating shafts 60 are rotatably supported by the front side frame 13F and the rear side frame 13R, and are integrally provided with gears 62.

Both ends in the back and forth directions of the two rotating shafts 60 that are rotatably supported by the front side frame 13F and the rear side frame 13R are also integrally provided with a pinion 63 that engages a corresponding vertical rack 67. The respective racks 67 are provided with both ends of an elevating guide 65 (see FIG. 1) that extends to the right and left. The right pinion 63 engages the corresponding gear 62, which is drivingly connected to the motor M3. The left pinion 63 and the corresponding gear 62 are drivingly connected by, for instance, a linkage (not shown). In the front and rear side frames 13F and 13R the elevating guides 65 are vertically and movably guided and supported by guiding members (not shown) that are provided and that extend vertically in the corresponding side frames 13F and 13R. The front and rear elevating guides 65 include guides 69, as, for instance, a guiding slot laterally extended, on which guided members 71 such as rollers of the front and rear elevating plate 55 are movably engaged from side to side.

Normally rotating and reversely rotating the motor M3 of the elevated driving mechanism 59 moves the elevating guides 65 through the gears 62, the pinions 63, and the racks 67. Consequently, the elevating frame 51 is vertically moved through the guiding members 71 that engage the guides 69 of the elevating guide 65. By actuating the reciprocating driving mechanism 39, the elevating frame 51 is reciprocatingly moved in the conveying direction (the X-axis direction) through the X-axis direction sliding frame 27.

Therefore, the elevating frame 51 is vertically moved relative to the transporting conveyor 5 and is also reciprocatingly moved along the conveying direction of the croissant dough 3 that is conveyed on the transporting conveyor 5.

The plurality of laterally elongated beams 73 is arranged between the right and left connecting members 57, both mounted on the upper portion of the elevating frame 51 such that both lateral ends of each beam 73 are attached to the connecting members 57. Note that the given number of the beams 73 corresponds to that of the rows of the croissant dough pieces 3 conveyed on the transportation conveyor 5. On the bottom surface of each beam 73, a plurality of interception pins 75 (three interception pins 75 are employed in this embodiment) is mounted at equal intervals between adjacent pins 75. These equal intervals correspond to each interval between the preceding piece and the immediately following piece, in the conveying direction, of the croissant dough pieces 3 conveyed on the transportation conveyor 5.

Each interception pin 75 intercepts the corresponding piece of the incoming croissant dough pieces 3 on the transportation conveyor 5 at the center of the length of that piece and at the leading side (downstream) of it in the conveying direction. The respective interception pins 75 are vertically mounted on the lower portion of respective pin holders 77 (see FIG. 7) that are provided with the beams 73.

To prevent adhesion between the croissant dough pieces 3 and the interception pins 75, each interception pin 75 may be preferably composed of micro-porous material such as a sintered alloy or a sintered resin, or a porous material having exhaust outlets, as, for instance, a plurality of pores and slits, in the circumference of each pin 75. Each pin holder 77 is provided with an air-supplying port 79, which is connected with an air source (not shown), to supply air to the corresponding interception pin 75.

Thus, by supplying the air from the air-supplying port 79 to the corresponding interception pin 75 when one croissant dough piece 3 is bent about that pin 75 at the center, this pin 75 can jet the air from its peripheral surface in the radial direction. The jetted air can form an air layer (or an air film) between the peripheral surface of the interception pin 75 and the inner peripheral surface of the bent croissant dough piece 3. Thus, by providing a means for ejecting the air to form the air layer, it can prevent each interception pin 75 from adhering to the corresponding croissant dough piece 3.

The conventional art relating to such an interception pin 75 will now be explained with reference to Patent Literature 1, 2, and 3.

Patent Literature 2 discloses a forming machine in which a mandrel 46 (corresponding to the interception pin 75 in the embodiment) is positioned at the center portion of a dough piece 20 (corresponding to the croissant dough piece 3), while a closing movement of a clam-shell cup portion 68 forms the dough piece 20. During the following opening movement of the clam-shell cup portion 68, an air jet is formed therein to apply it to the formed dough piece 20 such that it is forcedly removed from the mandrel 46 and the clam-shell cup portion 68.

However, if a sticking is generated between the outer periphery of the mandrel 46 and the inner periphery of the dough piece 20 on which the mandrel 46 is wrapped, the air jet injected from the clam-shell cup portion 68 cannot overcome the sticking. Thus, the dough piece 20 is drawn with the mandrel 46 adhering to it. This results in a problem in that the dough is elongated and extended in filaments from the dough piece 20. The result is that the dough is damaged.

Patent Literature 1 discloses an apparatus for the folding of croissants. In this apparatus, a front gage 25 (corresponding to the interception pin 75 of this embodiment) is positioned at the central part of a roll 11 (corresponding to the croissant dough piece 3 of this embodiment). In this condition, a pair of side gages 27 is rotated, forcibly curling the side parts of the roll 11 such that it is bent and formed. The front gage 25 is then upwardly withdrawn from the formed roll 11.

Patent Literature 3 discloses a dough piece bending machine. In this machine, a mandrel 16 (corresponding to the interception pin 75 of this embodiment) is positioned at the central part of a dough product 22 (corresponding to the croissant dough piece 3 of this embodiment). In this condition, a first bending station 25 and a second bending station 26 bend the dough product 22. Further, movable shaping elements 28 and 29 curl and bend the dough product 22 to form it. The mandrel 16 is then downwardly withdrawn from the formed product dough.

By means of the elements, disclosed in Patent Literature 1, 2, and 3, corresponding to the interception pin 75, the bent and formed croissant dough piece 3 (or an equivalent elongated dough piece) may often stick to the peripheral surface thereof when the interception pin 75 is withdrawn from the dough piece 3 relative to it. Therefore, these elements in Patent Literature 1, 2, and 3 could not overcome the forgoing problem involving the sticking.

Accordingly, this invention should not limited to the forming machine in this embodiment, even if the conventional forming machine or apparatus for forming a croissant dough piece, as disclosed in Patent Literature 1, 2, and 3, and their respective interception members corresponding to the interception pin 75 are provided with a means for injecting air, to form an air layer (or an air film) between the outer periphery thereof and the inner periphery of the bent food dough piece. Such a configuration can prevent the interception member from sticking to the food dough piece.

To prevent the sticking of the croissant dough piece and the like to the interception pin (the interception member) 75, the interception pin 75 may be manufactured by materials such as polyacetal and fluoloresin, having a property that inhibits the sticking of cohesive materials.

Figure 5:
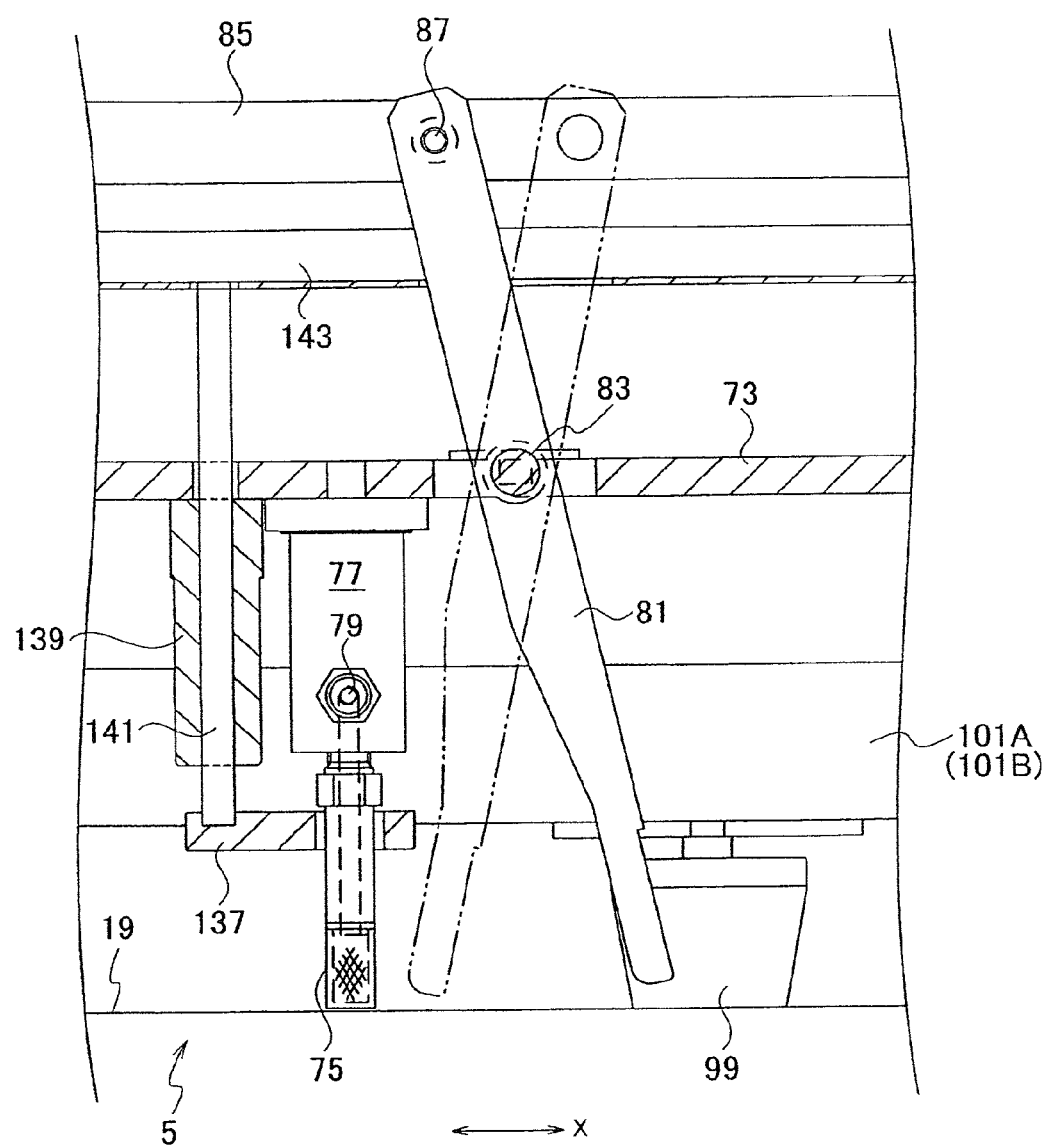
FIG. 5 is an enlarged view showing one part of FIG. 4 in more detail.

Interception arms 81 are provided with the beam 73 via pivoting shafts 83 such that they can be pivotally moved in the conveying direction. Each interception arm 81 intercepts the corresponding croissant dough piece 3 at the rear side (the leading side) thereof in the conveying direction, which is opposite the corresponding interception pin 75. In this condition, as discussed above, that interception pin 75 intercepts that croissant dough piece 3 at the front side of the center portion in the length thereof. As illustrated in FIG. 5 in detail, substantially the center portion of the length of each interception arm 81 is pivotally supported by the beam 73. The respective upper portions of the respective interception arms 81 that are arranged with equal intervals along the length of the beam 73 are pivotally connected to elongated connecting rods 85, which are extended along the conveying direction (the X-axis direction), by means of connecting pins 87.

Figure 4:
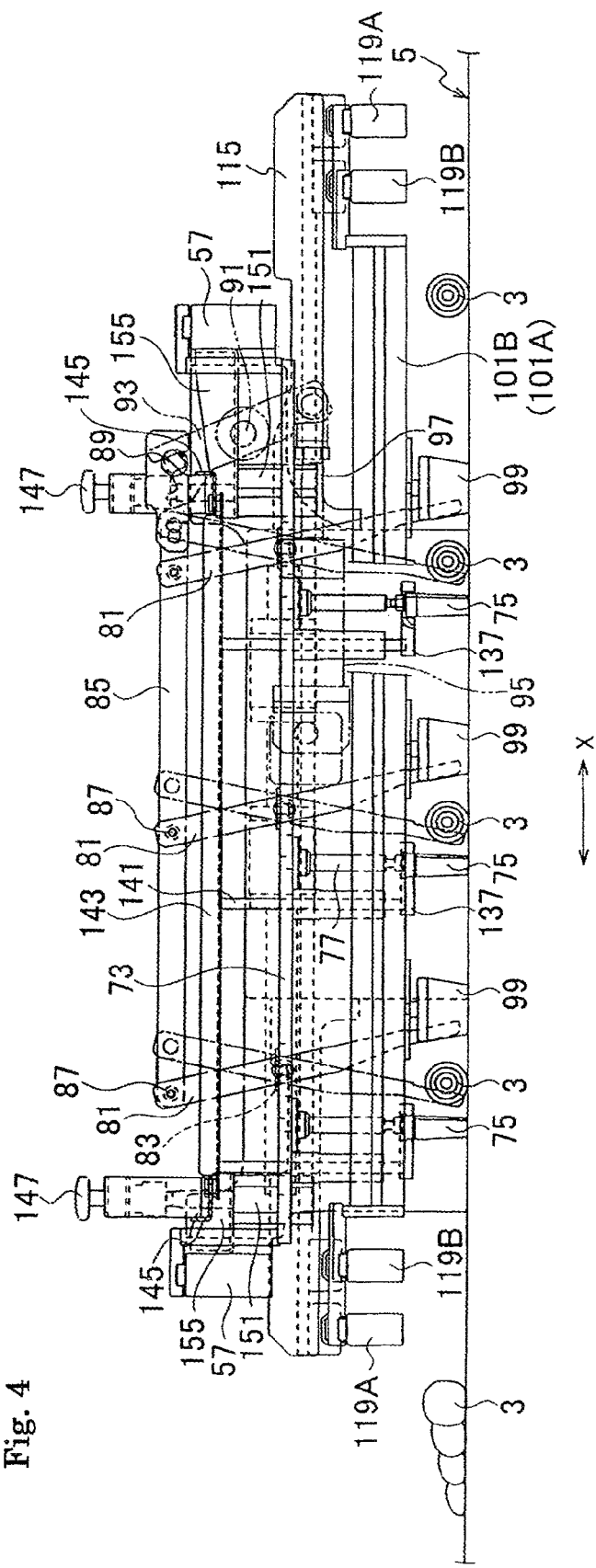
FIG. 4 is a front view illustrating an arrangement of a section for bending and forming croissant dough in the forming machine of FIG. 1.

Therefore, in FIG. 4, the connecting rods 85 are laterally moved such that the corresponding interception arms 81 are pivotally moved (rotated) in the same direction and in unison, since the upper portions thereof are pivotally connected to the connecting rods 85.

Note that the given number of the connecting roads 85 corresponds to that of the rows of the croissant dough pieces 3 conveyed on the transportation conveyor 5 and thus that of the rows of the interception pins 75. To move a plurality of the connecting rods 85 in the same direction and in unison, one end of each connecting rod 85 is pivotally connected to a pivoting shaft (a reciprocating shaft) 89, which is extended along the Y-axis direction (see FIGS. 3 and 4). Both ends, in the Y-axis direction, of the pivoting shaft 89 are supported by a pivoting lever 93. In turn, the pivoting lever 93 is pivotally supported by a horizontal supporting shaft 91 (see FIG. 3) such that it is pivotable in the X-axis direction. The horizontal supporting shaft 91 is mounted on the elevation plate 55 of the elevation frame 51 such that it is horizontal in the Y-axis direction.

To reciprocate (rotate) the reciprocating shaft (the pivoting shaft) 89 in the X-axis direction, the lower end of any one of the pivoting levers 93 is pivotally connected to the proximal end of an actuating rod 97, e.g., a piston rod, of a reciprocation actuator 95, e.g., an air cylinder.

Therefore, the air cylinder (the reciprocating actuator) 95 is actuated to reciprocate the actuating rod 97 in the X-axis direction such that the pivoting lever 93 is reciprocated in the X-axis direction around the supporting shaft 91 as the pivoting point. The respective supporting rods 85 are thus reciprocated in the X-axis direction in unison, through the pivoting shafts 89.

Accordingly, a plurality of the interception arms 81 in which the upper portions thereof are pivotally connected to the corresponding connecting rods 85 are pivotally moved in the X-axis direction such that their respective lower ends can intercept the corresponding croissant dough pieces 3 at the side (the leading side of the dough piece 3 in the conveying direction) opposite the respective corresponding interception pins 75.

As is already understood, on the croissant dough piece 3 that is conveyed on the transporting conveyor 5 in the X-axis direction, the interception pin 75 intercepts the central portion in the length thereof at the front side (the upstream side) thereof, while the interception arm 81 that is opposite the interception pin 75 intercepts the center portion at the rear side (the upstream) thereof. When, as discussed above, the interception pin 75 and the interception arm 81 intercept the corresponding croissant dough piece 3 at the front and the rear in the conveying direction thereof, both ends of the length thereof are bent (curved) about the centered interception pin 75 to form or join both ends, to produce the formed croissant dough piece 3 as a product.

To bend (curve) both ends of the croissant dough piece 3 in which the center portion is intercepted at the front and the rear by the interception pin 75, pressing members 99 (see FIG. 3) are provided. The pressing members 99 can be moved in the conveying direction of the croissant dough piece 3 and they can be moved toward each other in the Y-axis direction (the longitudinal direction). In detail, beneath both ends in the Y-axis direction of the beam 73 having the interception pins 75, a pair of supporting beams (a second supporting means) 101A and 101B (see FIG. 2) is arranged. Although the supporting beams 101A and 101B are extended in the X-axis direction (the conveying direction), the length of one beam 101A is longer than that of the other beam 101B. In turn, the respective lower portions of the respective supporting beams 101A and 101B are provided with the pressing members 99.

Figure 3:
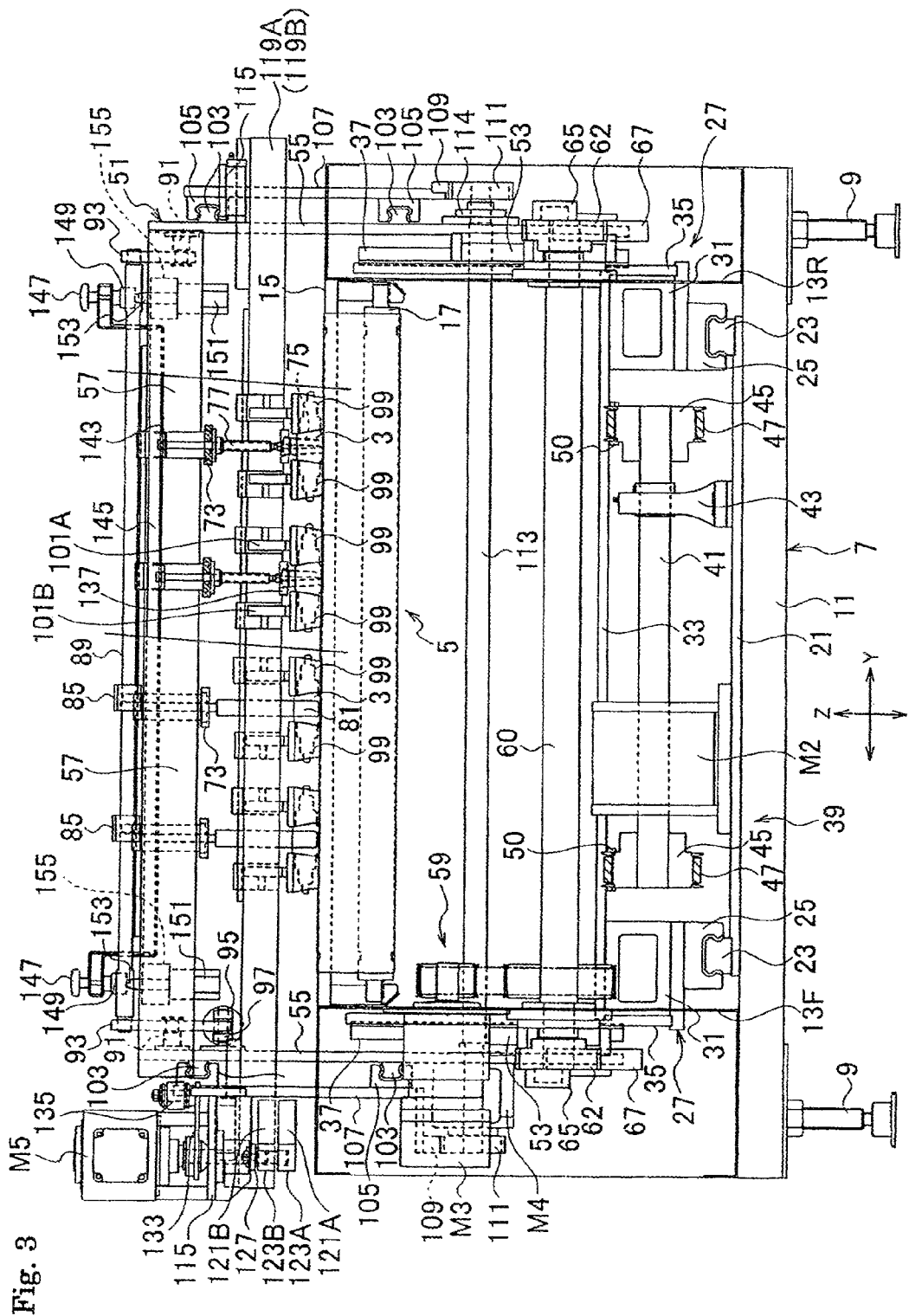
FIG. 3 is a side view of the forming machine of FIG. 1, in a view from the right direction, illustrating the primary components, with some components being omitted.

One pressing member 99 that is provided with one supporting beam 101A is a roller paired with the other pressing member 99 provided with the other supporting beam 101B such that they are opposed to one another in the Y-axis direction. As illustrated in FIGS. 3 and 4, each pressing member 99 is composed of a tapered roller that is downwardly tapered such that it can be rotated horizontally. Namely, a depressing surface to depress both ends of the corresponding croissant dough piece 3 forms a tapered surface. In other words, the depressing surfaces of a pair of pressing members 99 form inclined depressing surfaces such that the lower portions of them are separated from one another.

The embodiment employs an arrangement for reciprocating the paired pressing members 99 along the X-axis direction (the conveying direction), and for moving them toward and away from one another, as explained below.

Both elevating plates 55 on the elevating frame 51 in the Y-axis direction are provided with guiding rails 103 (see FIG. 2), on each of which an X-axis slider 107 through a sliding guide 105 is movably supported. Beneath each X-axis slider 107 an X-axis rack 109 is provided such that a corresponding pinion 111 is engaged thereto. One of the paired pinions 111 is mounted on the corresponding end of a rotating shaft 113, which extends along the Y-axis direction.

The rotating shaft 113 penetrates through the front and rear longitudinal plates 35 to allow it to move vertically. The rotating shaft 113 is rotatably supported by the rear (the right side in FIG. 3) elevated plate 55 through a bearing 114. To rotate the rotating shaft 113, a motor M4 (FIG. 1) such as a servo motor is mounted on the front elevated plate 55 such that the rotating shaft 113 is inserted and coupled to a hollow driving shaft of the motor M4.

Thus, as the rotating shaft 113 normally rotates and reversely rotates, the X-axis slider 107 is reciprocated along the guiding rails 103 in the X-axis direction, by means of the pinion 111 and the rack 109.

The X-axis slider 107 is provided with a supporting bracket 115 (see FIG. 2), which extends along the X-axis direction. On the lower surfaces of both ends of the supporting bracket 115 in the X-axis direction a pair of Y-axis sliders 117A and 117B is provided. On each Y-axis slider 117A or 117B, both ends of each of a pair of sliding rods 119A and 119B, which extend along the Y-axis direction, are movably supported, enabling the pair to move in the Y-axis direction.

The one sliding rod 119A, which is externally located along the X-axis direction (the conveying direction), is coupled to both ends of the longer supporting beam 101A in the X-axis direction, while the other sliding rod 119B, which is internally located along the X-axis direction, is coupled to both ends of the shorter supporting beam 101B.

Thus, as the sliding rods 119A and 119B move oppositely to each other in the Y-axis direction, the supporting beams 101A and 101B are moved in the Y-axis direction toward and away from each other. The respective pressing members 99 that are supported by the supporting beams 101A and 101B are also moved in the Y-axis direction toward and away from each other.

To move the sliding rods 119A and 119B, which are separated along the X-axis, in the opposite direction from each other along the Y-axis, they are integrally connected to each other by means of connecting bars 121A and 121B (see FIG. 1), which extend along the X-axis. Both ends of the respective connecting bars 121A and 121B are provided with brackets 123A and 123B (see FIG. 2), whose upper surfaces are provided with slots 125A and 125B along the X-axis. The lower portions of both ends of pivoting plates 127, which horizontally pivot along the Y-axis, are provided with actuating elements 129 (see FIG. 1), e.g., rollers or pins, such that they are engaged with the corresponding slots 125A and 125B, enabling them to be moved relative to each other.

The center portion of each pivoting plate 127, which extends along the X-axis, is integrally provided with a longitudinal shaft 131. The longitudinal shaft 131 is rotatably supported by the supporting bracket 115 in its vertical position. Each of the respective longitudinal shafts 131, which are separated along the X-axis, is attached to the proximal end of a pivoting lever 133. In turn, the distal end of the pivoting lever 133 is pivotally connected to both ends of a linkage 135 (see FIG. 2). Virtual lines between the pivoting points of the respective longitudinal shafts 131, the linkage 135, and the respective pivoting levers 133 form a quadrangle and thus a parallel linkage mechanism. One longitudinal shaft 131 is drivingly coupled with a motor M5, e.g., a servo motor, which is mounted on the supporting bracket 115.

Figure 2:
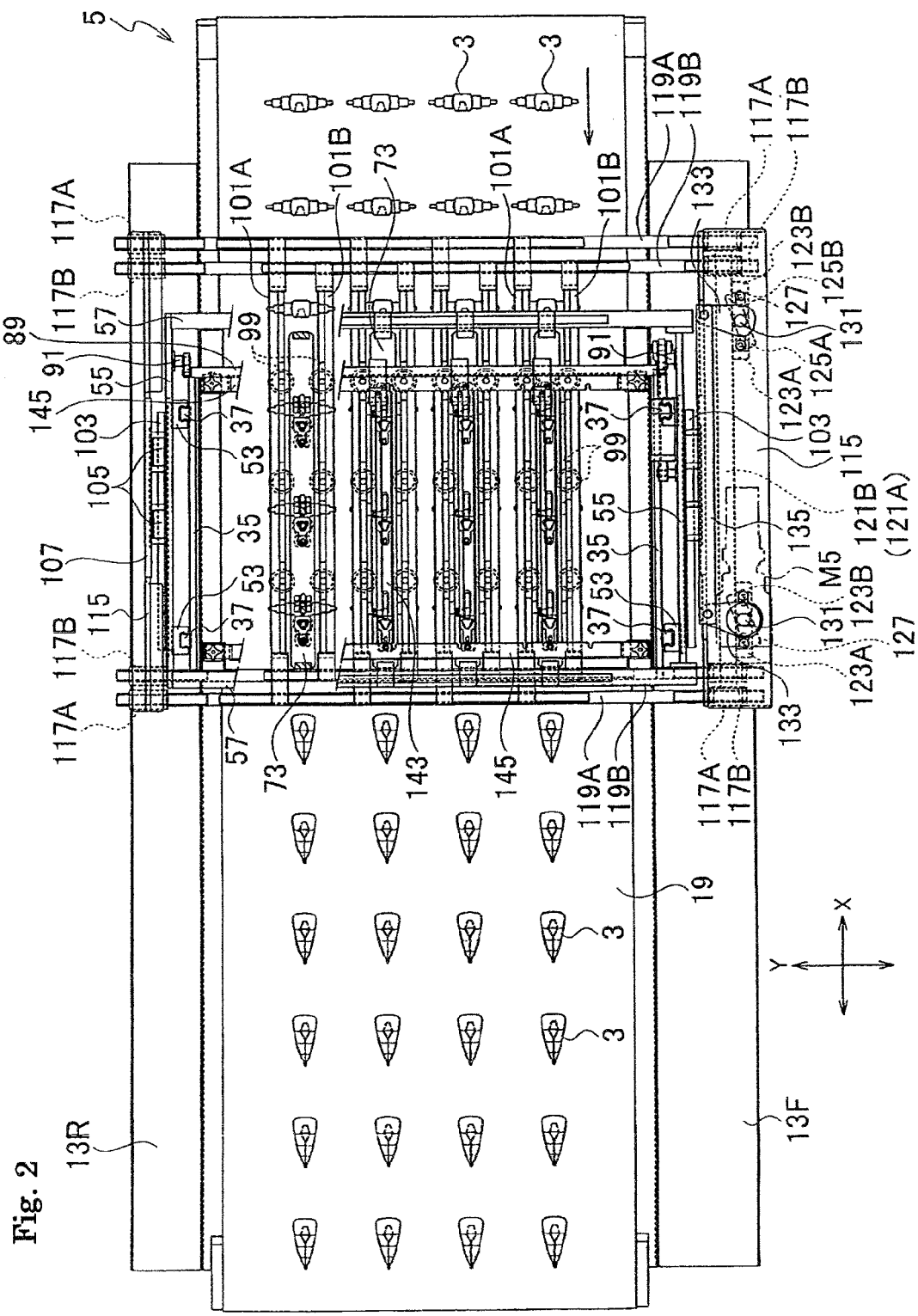
FIG. 2 is a plane view of the forming machine of FIG. 1 illustrating the primary components, with some components being omitted.

Thus, as the motor M5 rotates both normally and reversely, the corresponding longitudinal shaft 131 is normally rotated and reversely rotated. In FIG. 2, as the longitudinal shaft 131 rotates counterclockwise, the sliding rod 119A is moved down, while the sliding rod 119B is moved up, through the brackets 123A and 123B and the connecting bars 121A and 121B. As the longitudinal shaft 131 rotates clockwise, the paired pressing members 99 are moved away from each other through the supporting beams 101A and 101B.

As is already understood, the pressing members 99 can be vertically moved relative to the transporting conveyor 5, and can be moved in the conveying direction thereof. Further, the paired pressing members 99 can be moved along the Y-axis toward and away from each other.

The forming machine 1 also includes an uplift-prevention member 137 (see FIG. 5). The uplift-prevention member 137 intercepts from above the formed croissant dough piece 3, which has formed and curved around the interception pin 71 that is centered and positioned in the length thereof when that interception pin 71 is upwardly withdrawn therefrom, to prevent that piece 3 from being lifted up. The uplift-prevention member 137 is configured as a circle or in C-shape so as to surround the interception pin 75. The uplift-prevention member 137 is attached to the lower end of an elevated rod 141, which is slidably guided and supported vertically by a vertical guiding member 139, which is provided on the beam member 73. The upper end of the elevated rod 141 is attached to a vertically movable elevated beam 143.

The number of elevation beams 143, which all extended along the X-axis (the conveying direction), correspond to the rows of the interception pins 75. Both ends in the X-axis of the respective elevation beams 143 are attached to a pair of supporting beams 145 (see FIG. 3). The supporting beams 145 extend along the Y-axis and are spaced apart from each other along the X-axis. Both ends in the Y-axis of each supporting beam 145 are detachably secured to a supporting block 149 via a knob 147. The supporting block 149 is adjustably mounted on the upper end of a vertical actuating member 153, e.g., a piston rod, of a vertical actuator 151, e.g., an air cylinder, such that the vertical level thereof can be adjusted. The vertical actuator 151 is supported by the coupling member 57 via a bracket 155. As explained above, the coupling member 57 is coupled to both the front and rear elevated plates 55 on the elevated frame 51.

Thus, as the vertical actuator 151 is actuated, the uplift-prevention member 137 is vertically moved independently from the interception pin 75.

In the forming machine constructed as above, the croissant dough pieces 3 (elongated dough pieces) that have already been linearly rolled up are conveyed on the transporting conveyor 5, in a direction along the X-axis that is perpendicular to the length along the Y-axis of each dough piece 3. In this condition, the corresponding interception pins 75 are lowered such that their lower ends contact, or are close to, the upper surface of the transporting conveyor 5, and thus they are moved in the conveying direction thereof at substantially the same velocity thereof. As each interception pin 75 intercepts the center portion of the length of the target croissant dough piece 3 at the front side and thus moves together with that dough piece 3 in the conveying direction, the corresponding interception arm 81 intercepts the center portion of that dough piece 3 at the rear side.

Figure 6:
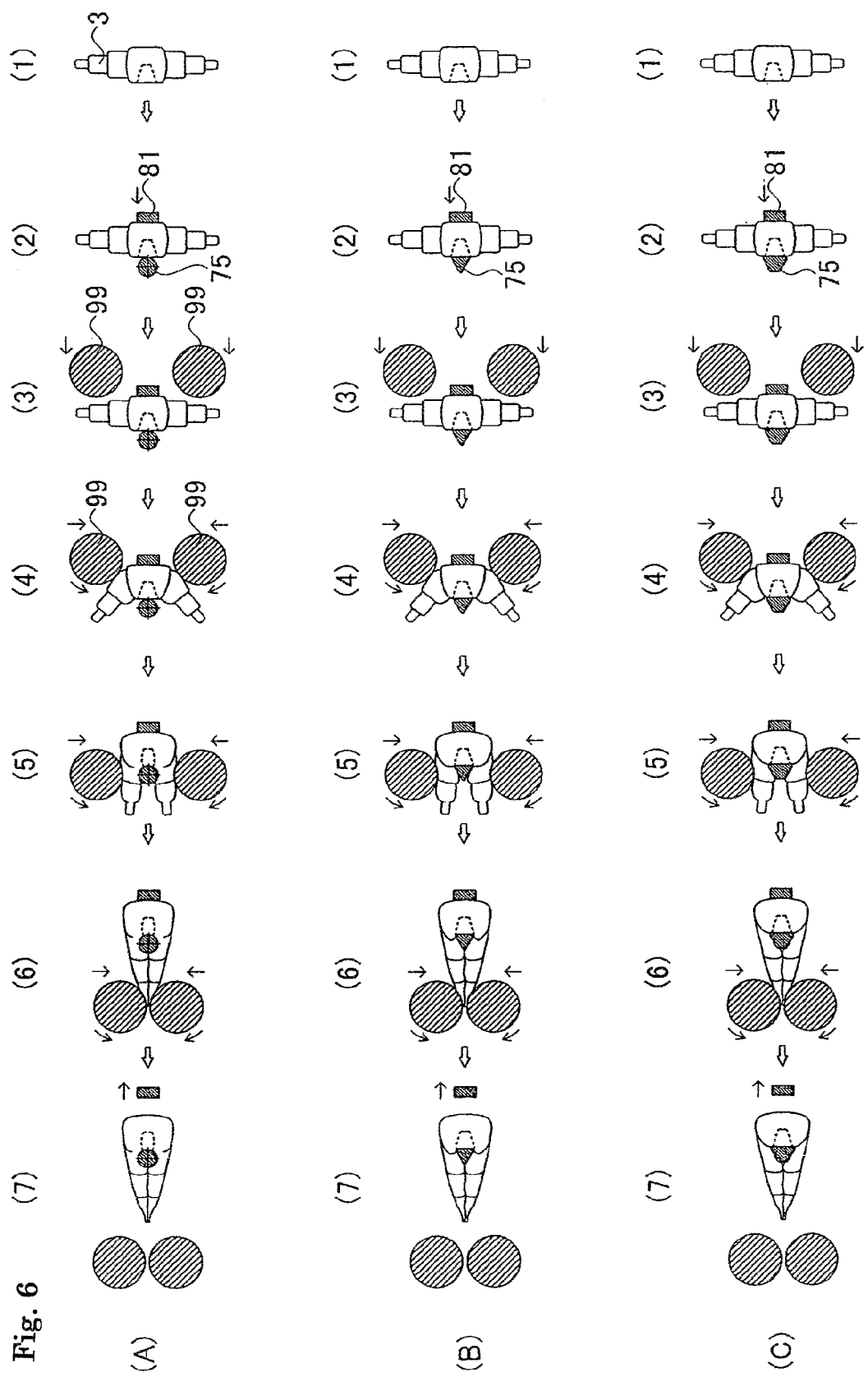
FIG. 6 is an illustration of a process for bending the croissant dough with the cross section of an interception pin being exemplified as a circle, a triangle, and a trapezoid.

FIG. 6 illustrates examples of the interception pins 75, which have different shapes in their horizontal cross sections. Their illustrated horizontal cross sections are a circle in FIG. 6(a), a triangle in FIG. 6(b), and a trapezoid in FIG. 6(c). The base of the triangle or the trapezoid of the interception pin 75 is arranged to intercept the center portion of the target croissant dough piece 3 at the front side. These shapes of the interception pin 75 can be selected based on the degree of the elasticity of the croissant dough piece 3. If the dough piece 3 has a relatively low elasticity, the circular shape may be used. If the dough piece 3 has a relatively high elasticity, the triangle or the trapezoid, both of which take the form of acute angles in both ends of the base, may be preferably used, thereby to provide a significant bending to the dough piece 3.

As illustrated in FIG. 4, each interception pin 75 may be preferably configured as a frustum shape, which is tapered such that the upper portion thereof has a larger diameter and the lower portion has a smaller diameter. Such a frustum-shaped interception pin 75 prevents the corresponding croissant dough piece 3 from having friction being generated between them when the pin 75 is upwardly withdrawn therefrom.

As discussed above, the interception pin 75 and the corresponding interception arm 81 intercept the center portion of the target croissant dough piece 3 at the front and the rear in the conveying direction (see FIGS. 6(A), 6(B), and 6(C)-(2)). In this condition, as the X-axis slider 107 moves in the conveying direction at a relatively high velocity in comparison with the velocity of the moving interception pin 75 while the paired pressing members 99 move toward each other, both ends of the length of the target croissant dough piece 3 are gradually bent about the interception pin 75 that is centered thereon (see FIGS. 6(A), 6(B), and (3), (4), and (5) in FIG. 6(C)).

The distance along the Y-axis between the paired pressing members 99 is substantially maintained constant when they contact both sides of the target croissant dough piece 3 to begin the bending. However, this distance is gradually narrowed immediately before and after the center position between the pressing members 99 passes through the X-axis to the corresponding interception pin 75 at the upstream side, to press both ends of the target piece 3 (see FIGS. 6(A), 6(B), and (7) in FIG. 6(C)). In this condition, the paired pressing members 99 provide a pressure bonding or a clamping between both ends of the target croissant dough piece 3, and roll that piece 3 at the leading edge (the left side in FIG. 6), where both ends of that piece 3 are bent and formed, to provide a pressure bonding). The pressing members 99 then further press both abutting ends or the proximal portion of the target croissant dough piece 3 to clamp them, and thus they are passed from the clamped ends to the downstream side of the conveying direction along the X-axis. The sliding arm 81 is released from the pressure on the target croissant dough piece 3 (see FIGS. 6(A), 6(B), and (7) in FIG. 6(C))

Because the pressing members 99 can be rotated and rolled on the target croissant dough piece 3, they can roll the target croissant dough piece 3 without damaging a laminated structure or a multilayered structure that includes dough and fat.

After both ends of the target croissant dough piece 3 are formed or pressure-bonded, the sliding arm 81 is then released from pressuring that piece 3, as described above. The interception pin 75 is then moved up to upwardly withdraw it from the target croissant dough piece 3, while air is ejected from the peripheral surface of the interception pin 75. At substantially the same time of, or at a slight delay after, beginning the upward motion of the interception pin 75, the uplift-prevention member 137 is lowered to prevent the croissant dough piece 3 from being inadvertently lifted up.

Therefore, the inadvertent lifting up of the interception pin 75 together with the croissant dough piece 3 is prevented. Also, the sticking between the interception pin 75 and the croissant dough piece 3 is inhibited. Accordingly, the croissant dough piece 3 is prevented from having friction with the interception pin 75 such that any damage, such as a rubbing on the surface of the croissant dough piece 3, can be avoided. Further, because the inadvertent lifting up of the croissant dough piece 3 can be avoided, the location of each croissant dough piece 3 can be kept continuously in place.

As described above, when the interception pin 75 is pulled up from the croissant dough piece 3, the pressing members 99 are integrally lifted up. The interception pin 75 and the pressing members 99 are then returned to their initial positions.

As described above, each pressing member 99 is composed of the tapered roller whose lower end has the smaller diameter. Therefore, when both ends of the croissant dough piece 3 are bent about the centered interception pin 75 thereon, downward components of force affect both ends of the croissant dough piece 3. Even if both ends of the croissant dough piece 3, which is gradually thinned toward the leading edge, are lifted from the upper surface of the conveyor belt 19, such a dough piece can thus be bent to contact both ends thereof with the upper surface of the conveyor belt 19, preventing the vertical level of both ends from being varied.

Both ends of the croissant dough piece 3 can always be steadily bent and formed when they are in contact with the upper surface of the conveyor belt 19. Thus, the clamping process for both ends of the croissant dough piece 3 can be carried out to produce a product having an excellent appearance.

Figure 7:
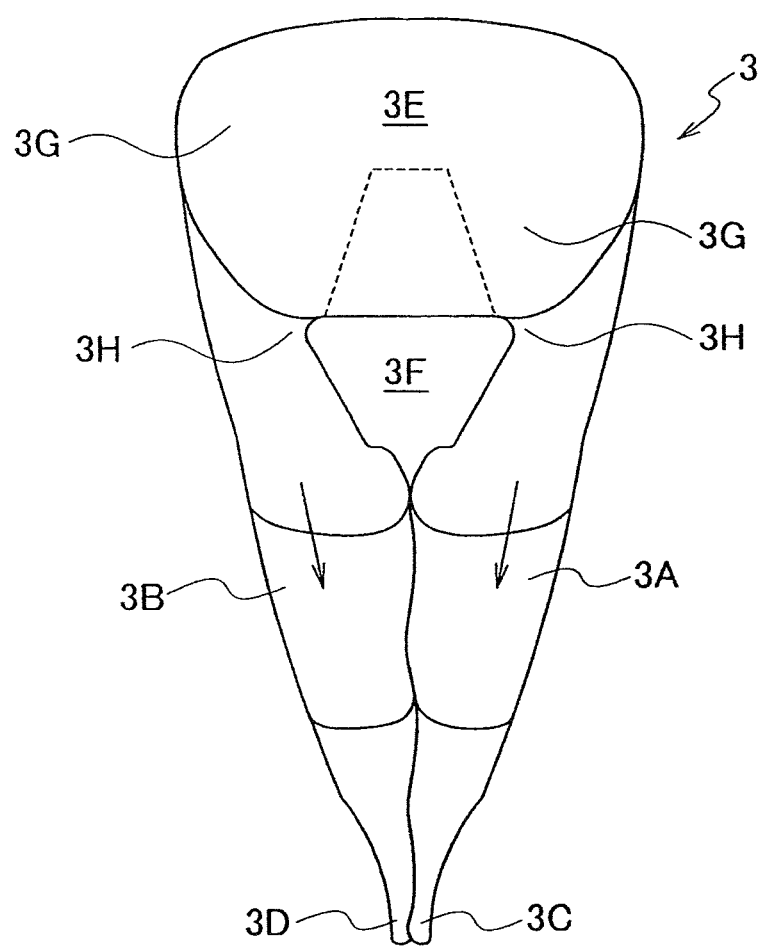
FIG. 7 is an illustration of the croissant dough before baking provided by the forming method and the forming machine.

FIG. 7 illustrates a plane view of the croissant dough piece 3, which is prepared as described above, by use of the trapezoidal interception pin 75, before baking. In the croissant dough piece 3, tip ends (both ends) 3C and 3D of both lateral side portions 3A and 3B are rigidly clamped such that this piece 3 generally forms a substantially isosceles triangle in which each of the three angles takes the form of an acute angle. Further, in the triangle an opening 3F from which the interception pin 75 is removed is formed between the base portion 3E and the lateral side portions 3A, 3B. Both lateral side portions 3A and 3B are pressure-bonded or clamped to each other over their length between the clamped tip ends 3C, 3D and the opening 3F.

In the croissant dough piece 3, junction portions 3G between the base portions 3E and the lateral side portions 3A, 3B are hardly bent at the acute angle about the centered interception pin 75. The lateral side portions 3A and 3B, which are extended from the junctions portions 3G to the tip ends 3C and 3D, are pinched by the paired pressing members 99 to roll and thus be extended toward the tip ends 3C and 3D (see the arrow in FIG. 7). Therefore, the junction portions 3G are hardly bent at the acute angle that is because the lateral side portions 3A and 3B are bent around the interception pin 75 using the pressing members 99 and because they are pinched and extended in a constant direction. In particular, when the interception pin 75 has the horizontal cross section, e.g., as a triangle or a trapezoid, in which both angles of the base take the form of the acute angle, bent portions 3H of the croissant dough piece 3 are hardly subjected to the bending function. This is because the bent portions 3H are adjacent portions of the acute angles that abut the dough piece 3.

Accordingly, even if the croissant dough piece 3 is entirely raised after baking, an inadvertent return motion applied to the junction portions 3G weakens that motion such that the tip ends 3C and 3D that have been hardly clamped are still maintained as they are, to prevent them from opening or separating therebetween.

The present invention is not limited to the embodiments described above, but other embodiments can be implemented by appropriately modifying the disclosed embodiment. The forgoing descriptions disclose one exemplar process in which the croissant dough piece 3 is conveyed, while both ends of the conveying croissant dough piece 3 are bent toward each other to form or clamp them. However, this exemplar process may be replaced with an alternative process in which the croissant dough piece 3 is conveyed to a predetermined site (a forming site) and both ends of the conveyed croissant dough piece 3 are formed or clamped thereat.

Moreover, the features of the disclosed embodiments may be combined with one another and with other features (including those taught in the patent literature referenced herein) in varying ways to produce additional embodiments. Accordingly, the invention is not to be limited by those specific embodiments, or by the methods of the present invention illustrated and described herein.

Although the disclosed embodiments are explained when they are used for croissant dough, any equivalent food dough, or modifications of the methods and machines for forming that dough, and variations of the present invention that would be obvious to those skilled in the art, are intended to be within the scope of this disclosure.

BRIEF DENOTATION OF NUMBERS

1 Forming machine
3 Croissant dough (elongated food dough) piece

5 Transporting conveyor
7 Mounting frame
11 Base frame
12 X-axis sliding frame
35 Longitudinal plate
51 Elevated frame (First supporting means)
55 Elevating plate
63, 111 Pinion
65 Elevating guide
67, 109 Rack
73 Beam
75 Interception pin (Intercepting means)
79 Air-supplying port
81 Interception arms
89 Pivoting shaft (Reciprocating shaft)
93, 133 Pivoting lever
99 Pressing member
101A, 101B Supporting beam
107 X-axis slider
119A, 119B Sliding rod
125A, 125B Slot
127 Pivoting plate
129 Actuator
135 Linkage
137 Uplift-prevention member
141 Elevating rod
143 Elevating beam
145 Supporting beam
151 Actuator for a vertical motion

The invention claimed is:

1. A forming machine for forming a croissant dough piece in which a croissant dough piece that has already been linearly rolled up is conveyed in a conveying direction perpendicular to the length of the croissant dough piece, the machine comprising:
   a transporting conveyor for conveying the croissant dough piece in the conveying direction;
   an interception pin for intercepting the center portion of the croissant dough piece of the length thereof at the leading side thereof along the conveying direction;
   tapered rollers for pressing the lateral end portions of the croissant dough piece about the interception pin that is centered thereon such that both ends of that dough piece move toward each other to form or join them;
   characterized in that
   the tapered rollers are a pair of tapered rollers, wherein each tapered roller can be rotated horizontally;
   a first supporting means supports the interception pin, wherein the first supporting means is arranged above the transporting conveyor such that the first supporting means is vertically movable and movable in the conveying direction;
   a second supporting means supports the pair of tapered rollers to allow them to move toward each other in a direction perpendicular to the conveying direction of the transporting conveyor, wherein a travelling motion of the pair of tapered rollers is faster than that of the interception pin along the conveying direction, and wherein the second supporting means is supported by the first supporting means; and
   wherein each tapered roller is downwardly tapered and provided with an inclined and tapered depressing surface such that the lower portions of the separated tapered rollers apply downward components of force on the lateral end portions of the croissant dough piece when they are joined or formed.

2. The forming machine for forming a croissant dough piece of claim 1, wherein the interception pin is composed of porous material or micro-porous material such that the circumferential surface thereof can be injected with air.

3. The forming machine for forming a croissant dough piece recited in claim 2, wherein said forming machine further comprises a circular bar for intercepting from above the croissant dough piece when the interception pin is pulled up therefrom, to prevent the croissant dough piece from being lifted up.

4. The forming machine for forming a croissant dough piece recited in claim 1, wherein said forming machine further comprises a circular bar for intercepting from above the croissant dough piece when the interception pin is pulled up therefrom, to prevent the croissant dough piece from being lifted up.

5. A forming machine for forming a croissant dough piece in which a croissant dough piece that has already been linearly rolled up is conveyed to a predetermined site in the conveying direction perpendicular to the length of the croissant dough piece, the machine comprising:
   a transporting conveyor for conveying the croissant dough piece in the conveying direction;
   an interception pin for intercepting the center portion of the croissant dough piece of the length thereof at the leading side thereof along the conveying direction;
   tapered rollers for pressing the lateral end portions of the croissant dough piece about the interception pin that is centered thereon such that both ends of that dough piece move toward each other to form or join them;
   characterized in that
   the tapered rollers are a pair of tapered rollers, wherein each tapered roller can be rotated horizontally;
   a first supporting means supports the interception pin, wherein the first supporting means is arranged above the transporting conveyor at the predetermined site such that the first supporting means is vertically movable and also movable in the conveying direction;
   a second supporting means supports the pair of tapered rollers to allow them to move toward each other in a direction perpendicular to the conveying direction of the transporting conveyor, wherein a travelling motion of the pair of tapered rollers is faster than that of the interception pin along the conveying direction, and wherein the second supporting means is supported by the first supporting means; and
   wherein each tapered roller is downwardly tapered and provided with an inclined and tapered depressing surface such that the lower portions of the tapered rollers move away from one another to apply downward components of force on the lateral end portions of the croissant dough piece when they are joined or formed.

6. The forming machine for forming a croissant dough piece of claim 5, wherein the interception pin is composed of porous material or micro-porous material such that the circumferential surface thereof can be injected with air.

7. The forming machine for forming a croissant dough piece recited in claim 6, wherein said forming machine further comprises a circular bar for intercepting from above the croissant dough piece when the interception pin is pulled up therefrom, to prevent the croissant dough piece from being lifted up.

8. The forming machine for forming a croissant dough piece recited in claim 5, wherein said forming machine further comprises a circular bar for intercepting from above the croissant dough piece when the interception pin is pulled up therefrom, to prevent the croissant dough piece from being lifted up.

9. A forming machine for forming an elongated dough piece, comprising:
a transporting conveyor for conveying an elongated dough piece that has already been linearly rolled up to a predetermined site on a conveying direction perpendicular to the length of the elongated dough piece;
an interception pin for intercepting the center portion of the conveyed elongated dough piece at the length thereof at the leading side thereof along the conveying direction;
tapered rollers for pressing the lateral end portions of the elongated dough piece about the interception pin that is centered thereon such that both ends of that dough piece move toward each other to form or be joined to them;
characterized in that
the tapered rollers are a pair of tapered rollers, wherein each tapered roller can be rotated horizontally and is downwardly tapered and provided with an inclined and tapered depressing surface, and wherein a travelling motion of the pair of tapered rollers is faster than that of the interception pin along the conveying direction; and
the interception pin composed of a porous pin that includes an air supplying port and air source from the circumferential surface of the porous pin.

10. The forming machine of claim 9, wherein the interception member is composed of porous material or micro-porous material such that the circumferential surface thereof can be injected with air.

11. The forming machine of claim 10, wherein the interception pin ejects the air jet when it is pulled up from the elongated dough piece.

12. The forming machine recited in claim 11, wherein said forming machine further comprises a circular bar for intercepting from above the croissant dough piece when the interception pin is pulled up therefrom, to prevent the croissant dough piece from being lifted up.

13. The forming machine recited in claim 10, wherein said forming machine further comprises a circular bar for intercepting from above the croissant dough piece when the interception pin is pulled up therefrom, to prevent the croissant dough piece from being lifted up.

14. The forming machine of claim 9, wherein the interception pin ejects the air jet when it is pulled up from the elongated dough piece.

15. The forming machine recited in claim 14, wherein said forming machine further comprises a circular bar for intercepting from above the croissant dough piece when the interception pin is pulled up therefrom, to prevent the croissant dough piece from being lifted up.

16. The forming machine recited in claim 9, wherein said forming machine further comprises a circular bar for intercepting from above the croissant dough piece when the interception pin is pulled up therefrom, to prevent the croissant dough piece from being lifted up.

* * * * *